United States Patent
Martynov et al.

(10) Patent No.: US 7,201,493 B2
(45) Date of Patent: Apr. 10, 2007

(54) ILLUMINATION SYSTEM AND DISPLAY DEVICE

(75) Inventors: Youri Martynov, Eindhoven (NL); Johannes Willem Herman Sillevis Smitt, Ulvenhout (NL); Gibbo Johannes Abrahamse, Eindhoven (NL); Wilhelmus Adrianus Gerardus Timmers, Eindhoven (NL)

(73) Assignee: Philips Lumileds Lighting Company, LLC, San Jose, CA (US)

( * ) Notice: Subject to any disclaimer, the term of this patent is extended or adjusted under 35 U.S.C. 154(b) by 39 days.

(21) Appl. No.: 10/810,169

(22) Filed: Mar. 25, 2004

(65) Prior Publication Data

US 2004/0227869 A1 Nov. 18, 2004

(30) Foreign Application Priority Data

Mar. 28, 2003 (EP) .................................. 03100816
Jul. 30, 2003 (EP) .................................. 03102348

(51) Int. Cl.
*F21V 9/00* (2006.01)
(52) U.S. Cl. ........................ 362/231; 362/27; 362/600; 362/230; 362/561
(58) Field of Classification Search ............... 362/231, 362/27, 600, 601, 613, 559, 800, 812, 612, 362/230, 561; 257/79, 80, 40; 345/589, 345/690, 694–696
See application file for complete search history.

(56) References Cited

U.S. PATENT DOCUMENTS

| 5,975,728 | A | 11/1999 | Weyer |
| 6,536,914 | B2 | 3/2003 | Hoelen et al. |
| 6,836,271 | B2 * | 12/2004 | Tezuka et al. ........... 345/472.2 |
| 2002/0071288 | A1 | 6/2002 | Lim |
| 2002/0159002 | A1 | 10/2002 | Chang |
| 2002/0167016 | A1 | 11/2002 | Hoelen et al. |
| 2005/0007753 | A1 * | 1/2005 | Van Hees et al. .............. 362/31 |

OTHER PUBLICATIONS

European Search Report—3 pages.

* cited by examiner

*Primary Examiner*—Sandra O'Shea
*Assistant Examiner*—Mark Tsidulko
(74) *Attorney, Agent, or Firm*—Patent Law Group LLP; Brian D. Ogonowsky; Rachel V. Leiterman (57) ABSTRACT

A backlight illumination system for illuminating a large area with light of a uniform color has a set of a pre-determined number of light emitters arranged along a straight line. The set is divided in a plurality of subsets, each subset including at least two light emitters. Each subset comprises light emitters with substantially the same light-emission color point, the respective subsets having color points different from each other. As a first step, the light emitters of the subset with a smallest number of light emitters are assigned to respective substantially equidistant positions. The light emitters of the set are assigned to the respective positions by iteratively starting with the subset with the smallest number of light emitters, assigning the light emitters of the subset to substantially equidistant positions which are not yet occupied. The backlight illumination system according to the invention has a uniform light and color distribution.

16 Claims, 6 Drawing Sheets

ILLUMINATION SYSTEM AND DISPLAY DEVICE

BACKGROUND

1. Field of Invention

The invention relates to a backlight illumination system for illuminating a large area with light of a uniform color. In addition, the invention relates to a display device comprising such a backlight illumination system.

2. Description of Related Art

When light sources of different color are used for creating a uniform illumination system, a problem of achieving good color uniformity arises. Not only the number of light emitters of each individual color must be selected properly but the light emitters must, in addition, be placed in an optimal pattern in order to avoid disturbing local color variations. The backlight illuminating system may have a special color mixing arrangement, such as, e.g., in a so-called edge-lit backlight illumination system for a liquid crystal display (LCD) device, the backlight being provided with a color mixing light guide. In another situation, the backlight illuminating system may have a relatively poor color mixing arrangement, such as, for example, in a direct backlight illuminating system. In yet another situation, the backlight illuminating system may have virtually no color mixing arrangement, such as, for example, in an edge-lit backlight illumination system for a LCD, the backlight not being provided with means for additional color mixing. Both types of backlight illumination systems require dedicated design rules. The light emitters can be light sources of essentially different color, such as, for example red (R), green (G) or blue (B) light sources. In another situation, the light emitters may comprise light sources with a color which was meant to be the same but came out slightly different due to, for example, the fabrication process variations. Examples of such a situation can be phosphor-converted light-emitting diodes (LEDs) with varied thickness of phosphor layer or multi-dice RGB white packages with varied brightness of individual dices.

In patent application WO A 02 090 826 a backlight illumination system for illuminating a display device is described comprising a light-emitting panel with a front wall, a rear wall and edge areas. At least one of the edge areas is light transmitting and associated with a light source. The light comprises symmetric clusters of light-emitting diodes (LEDs) having three mutually different light-emission color points, for example symmetric clusters of blue, green and red LEDs.

A disadvantage of the known backlight illumination system is that the light and color distribution of the backlight illumination system is insufficiently uniform. As a result the illumination of a large area with light of a uniform color is insufficient.

SUMMARY

The invention has for its object to eliminate the above disadvantage wholly or partly. According to the invention, a backlight illumination system of the kind mentioned in the opening paragraph for this purpose comprises: a set of a pre-determined number (N) of light emitters arranged along a straight line with N positions, the set being divided in a plurality of subsets, each subset including at least two light emitters, each subset including light emitters with substantially the same light-emission color point, the respective subsets having light-emission color points different from each other, the light emitters of the subset with a smallest number of light emitters being assigned to respective substantially equidistant positions, the light emitters of the set being assigned to the respective positions by iteratively starting with the subset with the smallest number of light emitters, assigning the light emitters of the subset to substantially equidistant positions which are not yet occupied.

BRIEF DESCRIPTION OF THE DRAWINGS

These and other aspects of the invention are apparent from and will be elucidated with reference to the embodiments described hereinafter.

In the drawings.

The Figures are purely diagrammatic and not drawn to scale. Notably, some dimensions are shown in a strongly exaggerated form for the sake of clarity. Similar components in the Figures are denoted as much as possible by the same reference numerals.

DETAILED DESCRIPTION

In the description and claims of the present invention, design rules for placing light emitters in a backlight illumination system are given resulting in a light and color distribution of the light emitted by the backlight illumination system with improved uniformity. In the known backlight illumination system, the placement of the light emitters is symmetrical with respect to an imaginary plain perpendicular to the line along which the individual light emitters are placed. Such a symmetric placement of the light emitters poses a restriction on the assignment of the light emitters in the backlight illumination system resulting in a less than configuration of the light emitters in the backlight illumination system.

According to embodiments of the invention, there are N positions for placing the light emitters. By way of example, a backlight illumination system comprising three kinds of light emitters is considered, i.e. red (R) light emitters, green (G) light emitters and blue (B) light emitters. (In an alternative example, four instead of three colors are taken into account: apart from red, green, and blue light emitters, a fourth type of light emitter of an additional color is employed, e.g., orange). Each of the respective colors is assigned to a subset. Hence, in the given example, the set of light emitters comprises three subsets: a first subset with a number of red light emitters, a second subset with a number of green light emitters and a third subset of blue light emitters, the total number of light emitters in the three subsets being N. The number of R, G, B light emitters used in each subset of the backlight illumination system is, inter alia, determined by the individual emission characteristics of the respective light emitters and by the desired color point of the backlight illumination system in combination with, e.g., the optical characteristics of a display device associated with the backlight illumination system. The number of members of the respective subsets can be calculated and optimized on basis of the desired optical configuration.

Suppose an outcome of such a calculation is that X red light emitters, Y green light emitters and Z blue light emitters are to be used, taking into account X+Y+Z=N. The total number N of light emitters is determined e.g. by the desired light output of the backlight illumination system, the desired dimensions of the backlight illumination system and by geometrical and/or thermal constraints imposed on the placement of the light emitters along the line.

According to embodiments of the invention, the assignment of the light emitters in the set starts with the subset comprising the smallest number of light emitters. If, by way of example, X<Y<Z, the assignment of the light emitters over the set of light emitters starts with the subset of X red light emitters. The X light emitters of the subset of the red light emitters are assigned to substantially equidistant positions. "Substantially equidistant" in this respect means that the light emitters of a given subset are placed at intervals which are as much as possible the same. This may imply that the number of positions between light emitters of a subset may vary, e.g. there are five positions between the first and second light emitter, four positions between the second and third light emitter, five positions between the third and fourth light emitter, etcetera. Such a configuration is more "substantially equidistant" than a configuration wherein there are four positions between the first and second light emitter, six positions between the second and third light emitter, four positions between the third and fourth light emitter, etcetera.

As a next step, the light emitters of the subset with the next smallest number of light emitters are assigned to the set. In the given example, the Y light emitters of the subset of the green light emitters are assigned to substantially equidistant positions, taking into account not to assign light emitters of this subset to positions which are already occupied by a light emitter of the previous subset.

This process is repeated iteratively until all light emitters are assigned to all N positions in the set. Normally, the light emitters of the last subset are placed at the remaining open positions along the line. In the event the number of light emitters in a certain subset equals that of another subset (e.g. X=Y), it does not matter by which subset the assignment is started.

A disadvantage of the known backlight illumination system is that it imposes restrictions on the total number of light emitters in the whole light source and in each color subset. As a result not the entire edge of the screen can be covered with light emitters and/or their relative number is sub-optimal for a specific color point. In such a backlight illumination system the light emitters of some colors will be driven at full power while the emitters of the other colors are driven at reduced powers leading to overall lower light output of the screen compared to a light source with optimal numbers of emitters in color subsets. The backlight illumination system according to the invention has a light and color distribution which is sufficiently uniform. As a result the illumination of a large area with light of a sufficiently uniform color is obtained.

A preferred embodiment of the backlight illumination system according to the invention is characterized in that the illumination system comprises a plurality of sets of the pre-determined number of light emitters, the light emitters of each set being arranged along the straight line. Preferably, the light emitters are arranged in an identical manner in each set. In this manner, the arrangement of the light emitters is relatively easy when the assignment has been established for the first set of light emitters.

Normally, upon assigning the light emitters an additional effect has to be taken into account. At the beginning as well as at the end of the straight line, a mirroring surface may be present. This may either be a "real" mirror caused by the walls of the backlight illumination system, the walls e.g. being provided with a reflecting mirror, or a "virtual" mirror in that an additional set of light emitters is arranged along the straight line. To this end, a preferred embodiment of the backlight illumination system according to the invention is characterized in that the assignment of the light emitters of the set takes into account mirroring effects at the beginning and at the end of the straight line. This mirroring effect changes the assignment of the light emitters in the set because account is taken of the light emitters, whether "concrete" or "virtual", in sets of light emitters adjacent to the "central" set under consideration along the line. The light emitters present at the other side of the (virtual) mirror are employed to further improve the light and color distribution of the backlight illumination system according to the invention.

Under normal manufacturing conditions, not all light emitters will be sufficiently identical as compared to each other. Some light emitters will have a slightly higher or a slightly lower luminous light output than the desired or average luminous light output of the corresponding subset. Such relatively small deviations from the ideal behavior can be taken into account in the assignment of the light emitters. To this end, a preferred embodiment of the backlight illumination system according to the invention is characterized in that at least one of the subsets of light emitters comprises at least one light emitter with a luminous light output substantially lower than the average light output of light emitters in said subset, said one light emitter being assigned to an area of the line where the distance between light emitters of said subset is smaller, and vice versa.

Suppose the "substantially equidistant" placement of the light sources implies that the number of positions between the light emitters of a particular subset varies in such a way that there are four positions between the first and second light emitter as well as four positions between the fourth and the fifth light emitter while there are five position between the second and the third light emitter as well as between the third and the fourth light emitter of said subset, then a light emitter with a luminous light output slightly higher than the average light output of light emitters in said subset, is preferably positioned at the location for the third light emitter (on both sides of this third position there are five positions for light emitters of other subsets).

An alternative preferred embodiment of the backlight illumination system according to the invention is characterized in that at least one of the subsets of light emitters comprises at least a first light emitter with a luminous light output substantially higher than the average light output of light emitters in said subset and in that said subset comprising at least a second light emitter with a luminous light output substantially lower than the average light output of light emitters in said subset, said first and second light emitter being assigned to positions relatively close to each other. When two light emitters are arranged relatively close to each other, effects of a luminous light output being somewhat higher for one of said light emitters and being somewhat lower for the other of said light emitters are compensated.

Under normal manufacturing conditions, not all light emitters will be sufficiently identical as compared to each other. The color of some light emitters will slightly deviate from the desired or average color of the light emitters of the corresponding subset. Such relatively small deviations from the ideal behavior can be taken into account in the assignment of the light emitters. To this end, a preferred embodiment of the backlight illumination system according to the invention is characterized in that at least one of the subsets of light emitters comprises at least one light emitter with color tri-stimulus values differing from the average color tri-stimulus values of the light emitters in said subset, said light emitter being assigned to an area of the line where the distance between light emitters of said subset is smaller.

A favorable embodiment of the backlight illumination system of the backlight illumination system according to the invention comprises at least three subsets of light emitters, the difference in color tri-stimulus values between a first and a second subset being larger than between the other subsets, the light emitters of said first and second subsets being arranged relatively close to each other.

For manufacturing purposes, the light emitters are preferably placed on a substrate provided with pre-determined and equidistant positions for the assignment. Nevertheless, according to the invention, the light emitters may be arranged at positions which are not equidistant. This enables more freedom for the assignment of the light emitters.

The invention also relates to a display device comprising a backlight illumination system as described hereinabove. Preferably, the display device comprises a liquid crystal display.

Figure 1:
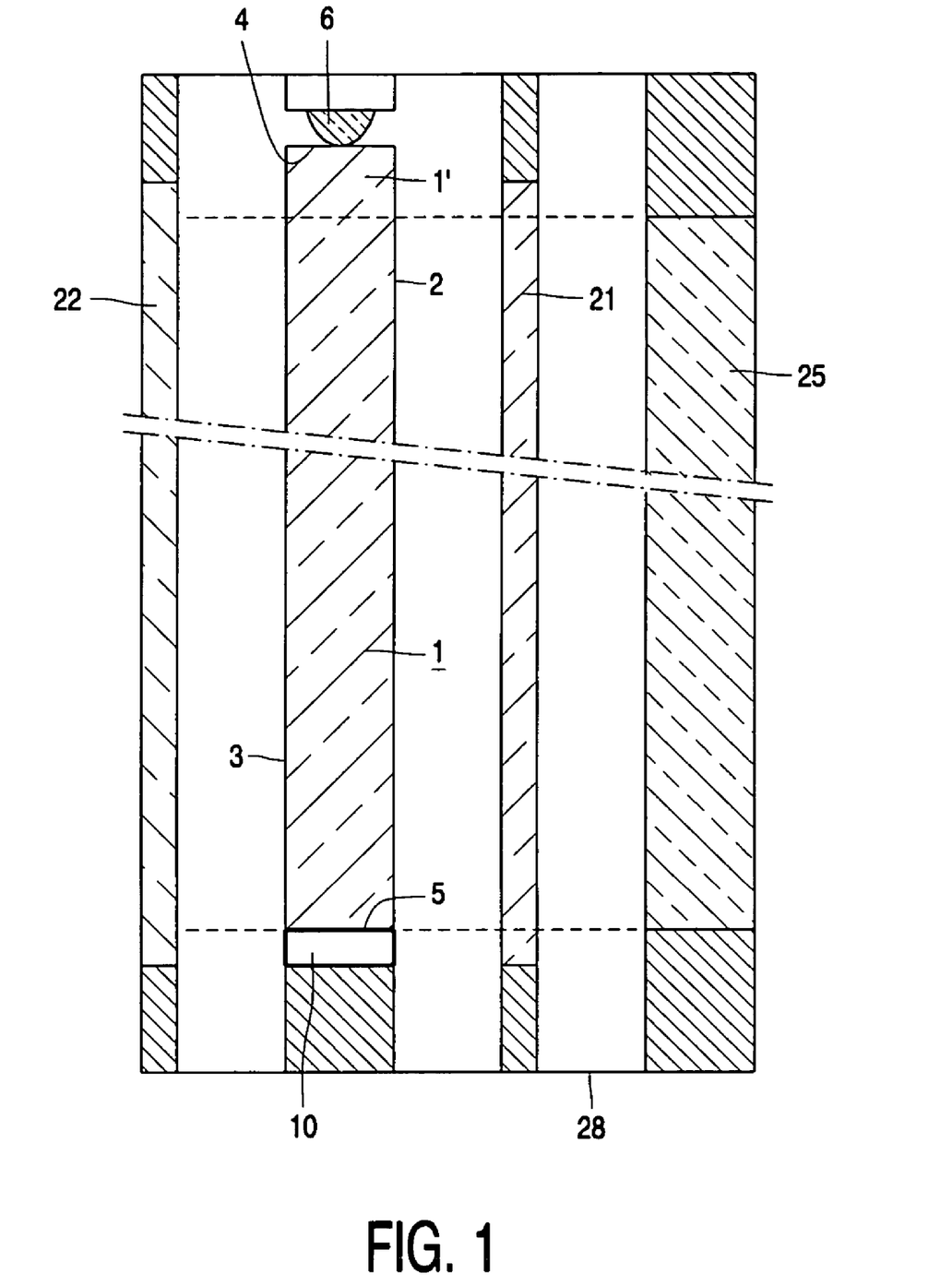
FIG. 1 is a cross-sectional view of a display device comprising an embodiment of the backlight illumination system according to the invention.

FIG. 1 schematically shows a cross-sectional view of an embodiment of a backlight illumination system in accordance with the invention. The illumination system comprises a light-emitting panel 1 of a light-transmitting material. The panel 1 is made from, for example, a synthetic resin, acryl, polycarbonate, PPMA, such as Perspex, or glass. In operation, light is transported through the panel 1 under the influence of total internal reflection. The panel 1 has a front wall 2 and a rear wall 3 opposite said front wall. Between the front wall 2 and the rear wall 3, there are edge areas 4, 5. In the example shown in FIG. 1, the edge area referenced 4 is light-transmitting, and at least one light emitter 6 is associated therewith. In operation, light originating from the light emitter 6 is incident on the light-transmitting edge area 4 and diffuses in the panel 1. In an alternative embodiment of the illumination system, also the edge area referenced 5 is light transmitting and a further light emitter is associated therewith.

In operation, the light-emitting panel 1 emits light in the direction of a display device, for example a liquid crystal display (LCD) device 25. For this purpose, the rear wall 3 of the light-emitting panel 1 is provided with means (not shown in FIG. 1) for coupling light out of the light-emitting panel 1. These means comprise (patterns of) deformations and include, for example, screen printed dots, wedges and/or ridges. The means are provided in the rear wall of the panel 1 by means of, for example, printing, pressing, etching, scribing or sandblasting. In an alternative embodiment, the deformations are (also) provided in the front wall of the light-emitting panel. The means couple light out of the light-emitting panel 1 by reflection, scattering and/or refraction. The means for coupling out light are generally non-uniformly distributed over the rear wall of the relevant light-emitting panel, i.e. they are provided at a predetermined gradient allowing light to be coupled out of the relevant illumination system as uniformly as possible.

The means for coupling out light serve as a secondary light source. A specific optical system may be associated with said secondary light source, which optical system is provided, for example, on the rear wall 2 (not shown in FIG. 1). The optical system may be used, for example, to produce a broad light beam.

In the example of FIG. 1, the light emitter 6 comprises a plurality of light-emitting diodes (LEDs). In general, the source brightness of LEDs is many times that of fluorescent tubes. In addition, when use is made of LEDs, the efficiency with which light is coupled into the panel is higher than in the case of fluorescent tubes. The use of LEDs as a light emitter has the advantage that the LEDs may contact panels made of a synthetic resin material. LEDs hardly emit heat in the direction of the light-emitting panel 1 and do not emit detrimental (UV) radiation. The use of LEDs has the additional advantage that means for coupling light originating from the LEDs into the panel can be dispensed with. The application of LEDs preferably leads to a more compact illumination system.

In FIG. 1, an optional (polarizing) diffuser 21 and a reflecting diffuser 22 are shown which bring about further mixing of the light originating from the light-emitting panel 1. FIG. 1 further shows, very diagrammatically, a display device, preferably a LCD panel 25. The assembly of the light-emitting panel 1, the light emitter 6, the diffuser 21, the display device 25 and a housing 28 forms a display device for displaying, for example, (video) images.

In FIG. 1, the light-emitting panel 1 is further provided with a sensor 10 for measuring the optical properties of the light which, in operation, is emitted by the light emitter 6. This sensor 10 is provided adjacent the edge area and is coupled to control electronics (not shown in FIG. 1) for suitably adapting the luminous flux of the light emitter 6. By means of the sensor 10 and the control electronics, a feedback mechanism can be formed which is used to influence the quality and the quantity of the light coupled out of the light-emitting panel 1.

In the example shown in FIG. 1, the LEDs contact the light-transmitting edge area 4. The first part of the light-emitting panel 1, referenced 1', is used to mix the light originating from the LEDs. Preferably, each one of the light-emitting diodes has a luminous flux of at least 5 lm. LEDs having such a high output are also referred to as LED power packages. The use of such high-efficiency, high-output LEDs has the specific advantage that, at a desired, comparatively high light output, the number of LEDs may be comparatively small. This has a positive effect on the compactness and the efficiency of the illumination system to be manufactured. The use of LEDs has the further advantage that dynamic illumination possibilities are obtained. If different types of LEDs are combined and/or LEDs of different colors are employed, it is possible to mix colors in a desirable manner, for example, to enable the illumination system to emit white light of the desired color temperature. In addition, color changes can be brought about irrespective of the condition of the display device.

Figure 2:
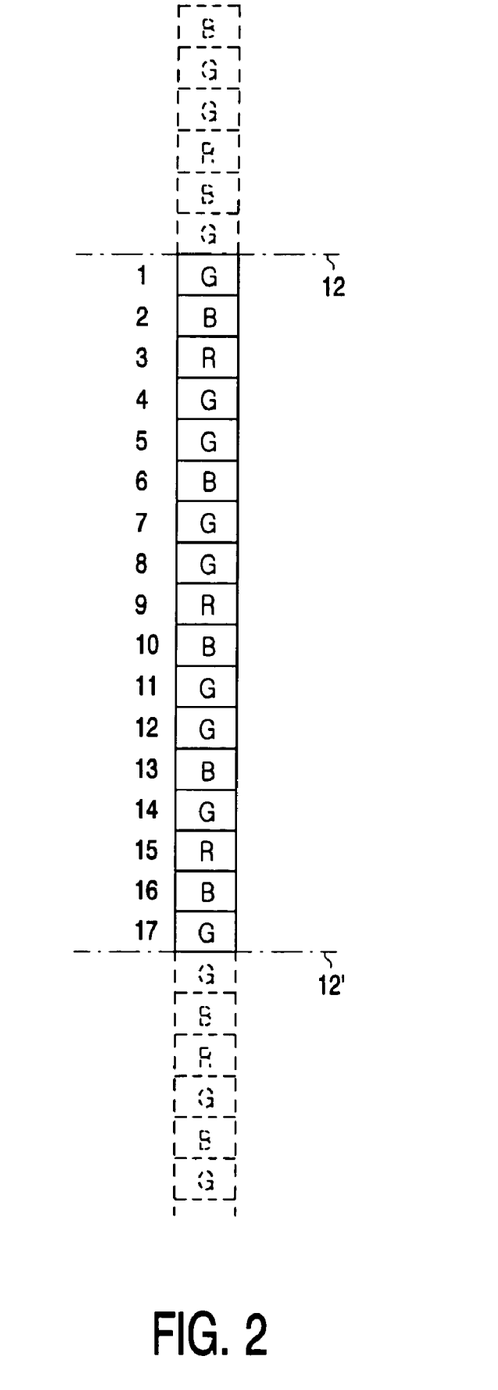
FIG. 2 shows an embodiment of the backlight illumination system according to the invention with an arrangement for a set of seventeen light emitters.

FIG. 2 shows an embodiment of the backlight illumination system according to the invention with an arrangement for a set of seventeen light emitters (N=17). The dotted positions in FIG. 2 show adjacent sets of (dotted) light emitters which either are real or virtual. These adjacent sets are either caused by mirroring effects of the central set of light emitters (positions indicated by the numbers 1 17) or by the presence of additional sets of light emitters. The (virtual) mirroring planes are indicated by the dash-dotted lines 12, 12'). The assignment of the light emitters (R, G, B) to positions in the set is according to the design rules as presented in the description and claims of this invention. In the example of FIG. 2 it can be seen that the set of seventeen light emitters is not symmetrical.

In the example of FIG. 2, the backlight illumination system comprises three kinds of light emitters is considered, i.e. red (R) light emitters, green (G) light emitters and blue (B) light emitters. Each of the respective colors is assigned to a subset. The set of light emitters comprises three subsets: a first subset with a number of red light emitters, a second subset with a number of green light emitters and a third subset of blue light emitters, the total number of light emitters in the three subsets being N. The number of R, G, B light emitters used in each subset of the backlight illumination system is, inter alia, determined by the individual emission characteristics of the respective light emitters (e.g. the light output and the tri-stimulus values of the light emitters of the respective subsets) and by the desired color point of the backlight illumination system in combination with, e.g., the optical characteristics of a display device associated with the backlight illumination system (e.g. the typical absorption characteristics of the R, G, and B pixels of an LCD device). The number of members of the respective subsets can be calculated and optimized on basis of the desired optical configuration.

Suppose the outcome of such a calculation is that 3 red light emitters, 9 green light emitters and 5 blue light emitters are to be used (3+9+5=17). The total number of seventeen light emitters is determined e.g. by the desired light output of the backlight illumination system, the desired dimensions of the backlight illumination system and by geometrical and/or thermal constraints imposed on the placement of the light emitters along the line.

According to the invention, the assignment of the light emitters in the set starts with the subset comprising the smallest number of light emitters. In this case the subset with the red light emitters comprises only three light emitters. Accordingly, the 3 light emitters of the subset of the red light emitters are assigned to substantially equidistant positions.

Figure 3A:
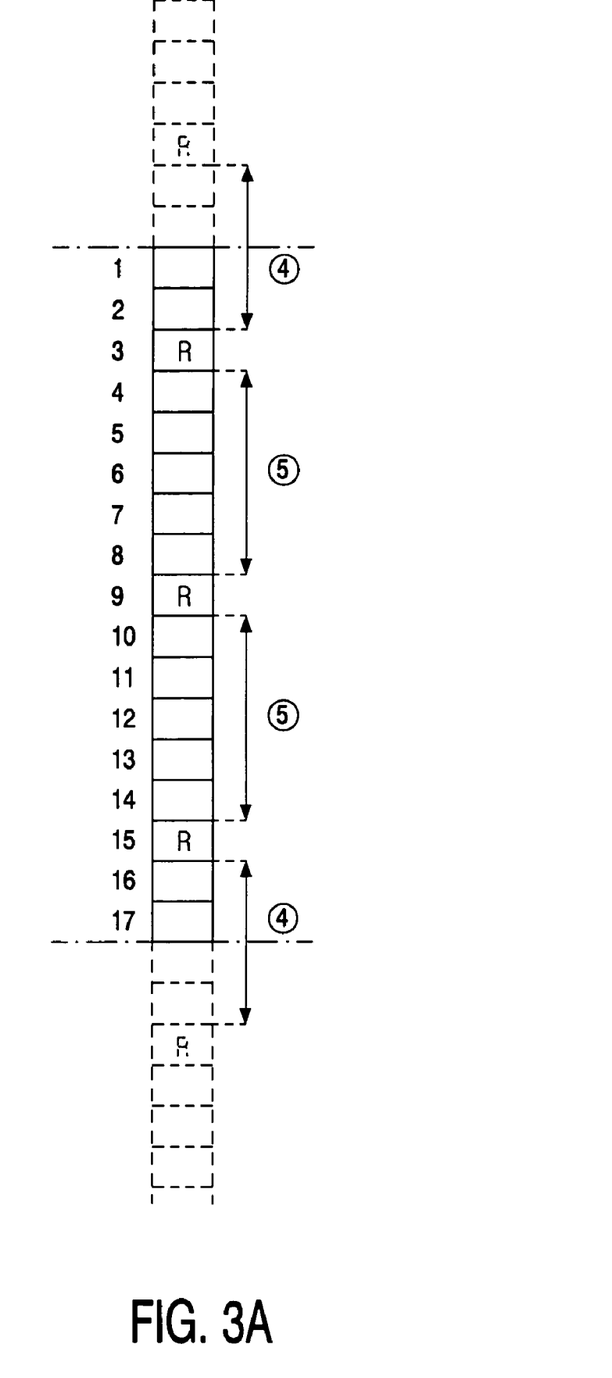
FIG. 3A shows a favorable placement of the light emitters of the subset with the smallest number of light emitters according to the invention.
Figure 3B:
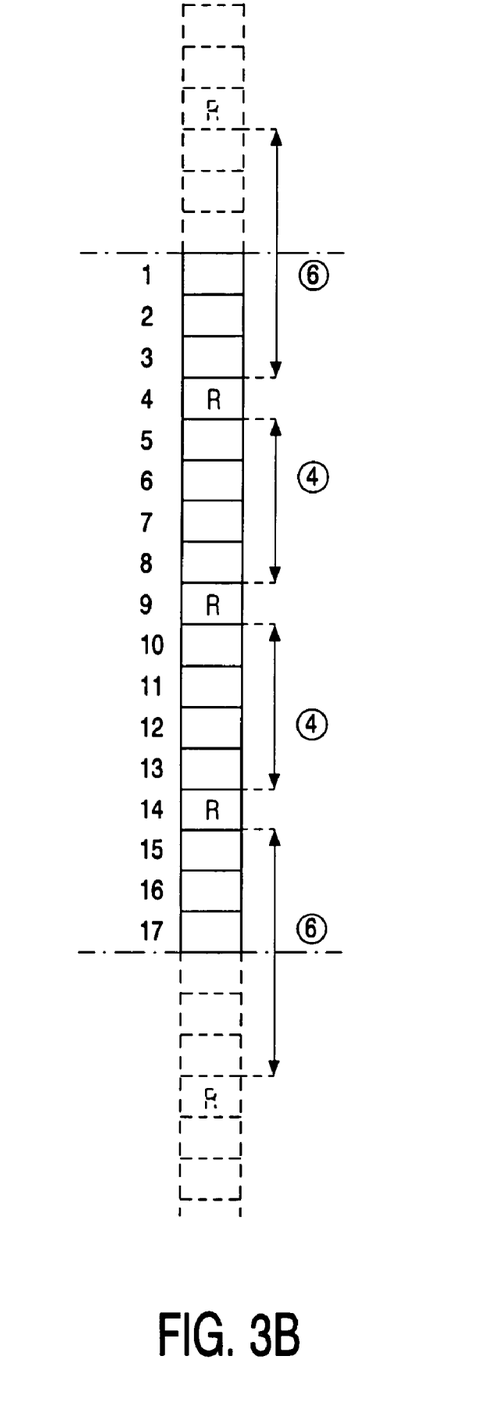
FIG. 3B shows a less favorable placement of the light emitters of the subset with the smallest number of light emitters according to the invention.

FIG. 3A shows a favorable placement of the light emitters of the subset with the smallest number of light emitters. FIG. 3B shows a less favorable placement of the light emitters of the subset with the smallest number of light emitters. In the examples of FIGS. 3A and 3B mirroring effects are taken into account at the beginning and at the end of the straight line.

In the examples of FIGS. 3A and 3B it can be seen that the light emitters of the subset with the smallest number of light emitters can not be placed perfectly equidistant. In the example of FIG. 3A the number of open positions between the red light emitters varies between four and five (indicated by the numbers placed in circles). In the example of FIG. 3B the number of open positions between the red light emitters varies between four and six (indicated by the numbers placed in circles). Without taking into account the mirroring effect, it may not be apparent which of the configurations shown in FIG. 3A or FIG. 3B is preferred. By taking into account the "dotted" light emitters in the adjacent sets of light emitters reveals that the assignment of the light emitters in FIG. 3A is more favorable than that in FIG. 3B. In the situation of FIG. 3A the light emitters are assigned more "substantially equidistant" than in FIG. 3B.

Under normal manufacturing conditions, not all light emitters in a subset will be sufficiently identical as compared to each other. Some light emitters will have a slightly higher or a slightly lower luminous light output than the desired or average luminous light output of the corresponding subset. Such relatively small deviations from the ideal behavior can readily be taken into account in the assignment of the light emitters. If one light emitter of the subset has a luminous light output substantially higher than the average light output of light emitters in said subset, said light emitter is, preferably, assigned to an area of the line where the distance between the light emitters of said subset is larger. In the example of FIG. 3A a red light emitter with a higher than average light output is, preferably, placed at the center position (i.e. position 9).

Figure 4:
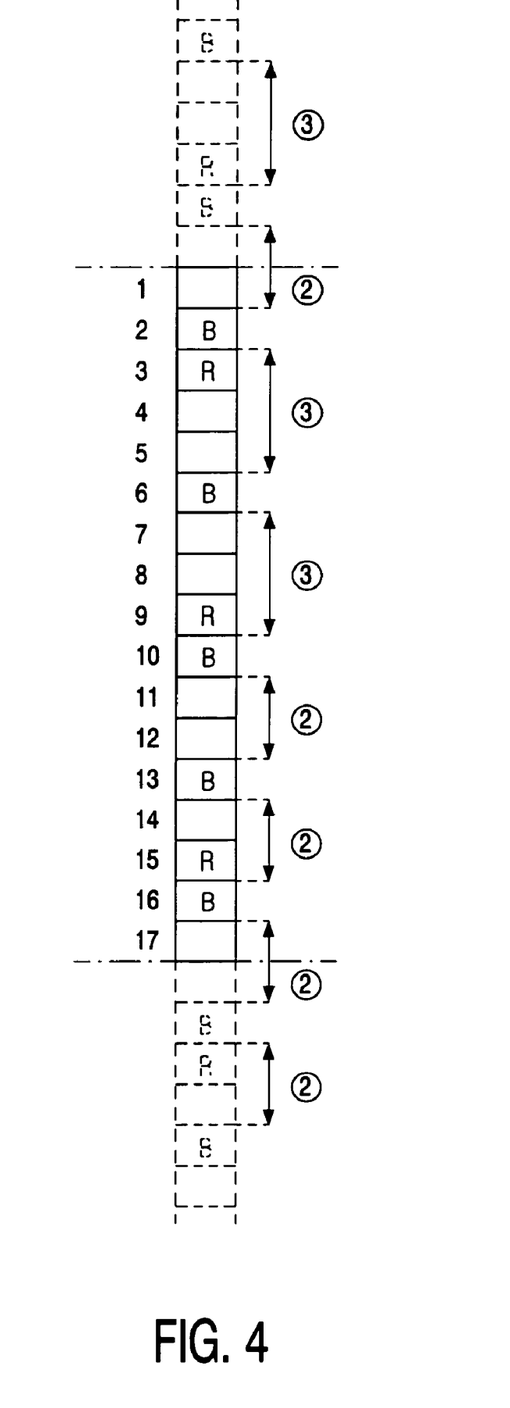
FIG. 4 shows a favorable placement of the light emitters of the subset with the next smallest number of light emitters, starting from the assignment of the light emitters in FIG. 3A.

When the light emitters of the subset with the smallest number of light emitters have been place, as a next step, the light emitters of the subset with the next smallest number of light emitters are assigned to the set. In the given example, the 5 light emitters of the subset of the blue light emitters are assigned to substantially equidistant positions, taking into account not to assign light emitters of this blue subset to positions which are already occupied by a light emitter of the previous (red) subset. Starting from the assignment of the three red light emitters in FIG. 3A, FIG. 4 shows a favorable placement of the five light emitters of the subset with the next smallest number of light emitters. In the examples of FIG. 4 mirroring effects are taken into account at the beginning and at the end of the straight line.

In the example of FIG. 4 it can be seen that the light emitters of the subset with the next smallest number of light emitters can not be placed perfectly equidistant. If the red light emitters were not present, the center position of the line (position 9) would be very suitable. However, this position is already occupied by a red light emitter. In the example of FIG. 4 the "center" blue light emitter was assigned to position 10. In an alternative embodiment, the "center" blue light emitter can be assigned to position 8, leading to similar results.

In the example of FIG. 4 the number of open positions between the blue light emitters varies between two and three (indicated by the numbers placed in circles). By taking into account the "dotted" blue light emitters in the adjacent sets of light emitters gives the assignment of the blue light emitters as shown in FIG. 4. In the situation of FIG. 4 the blue light emitters are assigned "substantially equidistant" although the pattern at first sight seems relatively irregular.

If one of the light emitters of the subset under consideration would comprise at least one light emitter with a luminous light output substantially higher than the average light output of light emitters in said subset and that said subset would comprise at least a second light emitter with a luminous light output substantially lower than the average light output of light emitters in said subset, said first and second light emitter would, preferably, be assigned to positions relatively close to each other. In the example of FIG. 4 a blue light emitter with a relatively high light output and a blue emitter with a relatively low light output are, preferably, assigned to positions 10 and 13 or to positions 13 and 16.

Normally the assignment process is repeated iteratively until all light emitters are assigned to all N positions in the set. In the example of FIG. 4, only the green light emitters are not yet assigned. The light emitters of the subset with the largest number of light emitters are assigned to the remaining open positions along the line. In this manner the situation as shown in FIG. 2 is obtained.

Figure 5:
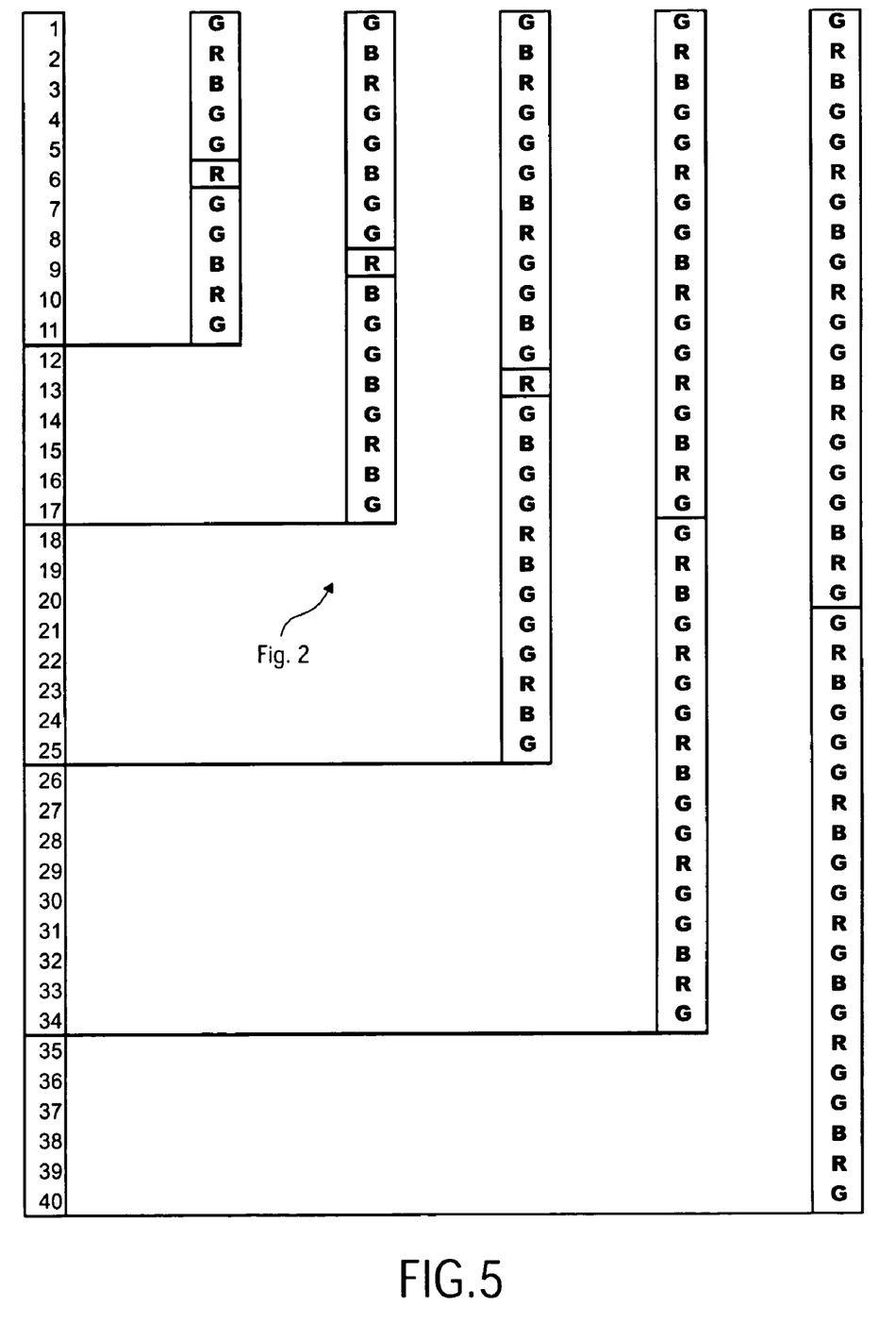
FIG. 5 shows five embodiments of the backlight illumination systems according to the invention.

FIG. 5 shows five embodiments of the backlight illumination systems according to the invention. In the embodiments of FIG. 5 mirroring effects are taken into account at the beginning and at the end of the set of light emitters.

The first embodiment in FIG. 5 comprises a set of eleven light emitters. Given the three types of light emitters employed: three red, six green and two blue light emitters have been assigned, starting with the blue light emitters assigned to positions 3 and 9, followed by the three red emitters assigned to positions 2, 6 (center position) and 10. Finally, the six green light emitters are assigned to the remaining open positions. The set of eleven light emitters is designed such as to form a suitable edge-lit for a display device with a diagonal of 5" ($\approx$12.7 cm) along the long side of the display or for a display device with a diagonal of 7" ($\approx$17.8 cm) along the short side of the display. It is noted that the first embodiment in FIG. 5 comprises a symmetrical assignment of the red, blue and green light emitters.

The second embodiment in FIG. 5 comprises a set of seventeen light emitters. Given the three types of light emitters employed: three red, nine green and five blue light emitters have been assigned, starting with the red light emitters, followed by the blue emitters. Finally, the remaining nine green light emitters are assigned to the remaining open positions. This second embodiment is the same as shown in FIG. 2 and has been build according to the assignments shown in FIG. 3A and FIG. 4. The set of seventeen light emitters is designed such as to form a suitable edge-lit for a display device with a diagonal of 7" ($\approx$17.8 cm) along the long side of the display. It is noted that the second embodiment in FIG. 5 comprises a asymmetrical assignment of the red, blue and green light emitters.

The third embodiment in FIG. 5 comprises a set of twenty-five light emitters. Given the three types of light emitters employed: five red, fourteen green and six blue light emitters have been assigned, starting with the red light emitters, followed by the blue light emitters. Finally, the green light emitters are assigned to the remaining open positions. The set of twenty-five light emitters is designed such as to form a suitable edge-lit for a display device with a diagonal of 12" ($\approx$30.5 cm). It is noted that the third embodiment in FIG. 5 comprises a symmetrical assignment of red the light emitters. However, the assignment of the blue and green light emitters is asymmetrical.

The fourth embodiment in FIG. 5 comprises a set of thirty-four light emitters. Given the three types of light emitters employed: ten red, eighteen green and six blue light emitters have been assigned, starting with the blue light emitters, followed by the red light emitters. Finally, the green light emitters are assigned to the remaining open positions. The set of thirty-four light emitters is designed such as to form a suitable edge-lit for a display device with a diagonal of 15" ($\approx$38.1 cm). It is noted that the fourth embodiment in FIG. 5 comprises a symmetrical assignment of the light emitters.

The fifth embodiment in FIG. 5 comprises a set of forty light emitters. Given the three types of light emitters employed: ten red, twenty-two green and eight blue light emitters have been assigned, starting with the blue light emitters, followed by the red light emitters. Finally, the green light emitters are assigned to the remaining open positions. The set of forty light emitters is designed such as to form a suitable edge-lit for a display device with a diagonal of 18" ($\approx$45.7 cm). It is noted that the fifth embodiment in FIG. 5 comprises a symmetrical assignment of the light emitters.

The invention can also be described as follows.

A light source ("backlight illumination system") providing the illumination of a large area with the light of uniform color composed of a number of individual light emitters arranged in a straight line each emitting the light of a color different from the color of light emitted by some other light emitters in said source and distributed over the distance comparable with linear dimensions of the illuminated area. Said light source has the following characteristics: it contains several color sets of light emitters ("subsets of light emitters"), each color set emitting light of essentially the same color (and spectrum); and light emitters are arranged in such a way that the light emitters of the color sets containing the smallest number of light emitters are arranged essentially equidistantly over the length of the light source.

Preferably, in such a light source, the light emitters are arranged in such a way that the light emitters of the two color sets whose XYZ color tri-stimulus values differ most from each other are placed next to each other along the line. Preferably, in such a light source the light emitters are arranged in a periodic fashion, the light source being composed of small sub-sequences of light emitters, each sub-sequence containing the light emitters from all color sets ("subsets") arranged in an identical order. Said sub-sequence does not have to be symmetrical.

Preferably, some color sets contain light emitters with luminous light output substantially higher and/or lower than the average light output of the light emitters in this color set. Preferably, such light emitters with luminous light output higher and/or lower than the average light output of their respective color sets are located close to the outer ends of the light source.

Preferably, the light emitters with luminous light output higher and/or lower than the average light output of their respective color sets are located in the area where the distance between the light emitters of the color sets deviates from the average distance between the light emitters of this color set. If the local distance between the light emitters of this color set is less than average, the light emitters with lower than average luminous output are used; if the local distance between the light emitters of this color set is greater than average, the light emitters with higher than average luminous output are used. For example, in FIG. 2, the average distance between blue emitters is 2.5 positions. Assuming that the luminous output of the blue emitter at position 6 is greater than the average and the luminous output of the blue emitter at position 13 is less than the average, the blue emitter at position 6 should be spaced three positions from its neighboring blue emitter, while the blue emitter at position 13 should be spaced two positions from its neighboring blue emitter.

The rules for the assignment of light emitters for a backlight illumination system can also be described as follows.

For a linear light source for a backlight system ("backlight illumination system") with a large mixing length for, e.g., an edge-lit backlight with color mixing arrangement, the LEDs ("light emitters") are not assembled in clusters. Color uniformity is achieved by selecting placing positions.

Essentially all color must be placed along a line, such that the distances between light emitters of the same color ("subset of light emitters"), is the same between all LEDs from that color. For each light emitter from a specific color (subset) that is closest to the edge, the distance to the edge of the color mixing arrangement must be the half of the distance between two light emitters of the same color. Assigning the light emitters according to this rule gives conflicts in placing LEDs in a line, since the number of locations where LEDs can be placed is discrete and limited. Thus, it is desired to have LEDs of different color in the same spot of the linear light source. Preferably, this dilemma is dealt with in the following way. First all LEDs of the least numerous color ("subset with the smallest number") are placed (substantially) equidistantly. Secondly, the LEDs of the second least color ("subset with the next smallest number") are placed. If the desired spot for placement ("position") is already taking by a LED of the least numerous color, a nearby spot must be selected. Preferably, the rule of equidistant placement is followed as closely as possible for this second color. Thirdly (or finally, depending on the number of different colors applied), the LEDs of the third least numerous color are placed, by filling up the open locations.

A light source ("backlight illumination system") that is constructed according to the above rules may still deviate from one that enables optimal color uniformity because of the discrete locations where the LEDs are placed and because deviations of the optimal locations are necessary since two LEDs of different color cannot sit on the same spot. This non-optimality is assuming that all light emitters within a color have identical color and brightness. As a consequence, over the length of the light source, there will be areas where the content of a given color is too high and there will also be areas where the content of that given color is too low. By selecting light emitters that are brighter than the average of a given color on spots within an area where it is content is too low, a more uniform light source can be achieved. The same result can also be achieved by selecting dimmer light emitters of the complementary colors. Another way to improve color uniformity is to select the color of the LEDs such that a more uniform result is achieved. The three solutions can be combined (and/or) into one approach. This approach assumes that there is enough variation in color and brightness in LED fabrication and that the color and brightness of the individual light emitters is known with certain accuracy.

For a linear light source for a backlight system ("backlight illumination system") with a short mixing length, e.g., for a direct backlight, the light emitters are preferably clustered into identical groups. However, the cluster configuration within the cluster need not be symmetrical. In particular, as a light source for the direct backlight a linear arrangement of LEDs is proposed comprising 4-LED clusters with the following color configuration: GRBG. In such a case, the light source configuration is GRBGGRBG . . . GRBG.

To further improve the color uniformity, the LEDs with the flux deviating from the average in the area's of the light source are assigned to positions where the color point would otherwise deviate from the average color point. In particular, for the above light source configuration for the direct backlight, preferably, light emitters are employed with a flux of at least 1.3 times lower than the average flux at the underlined positions in the sequence: GR̲BGGRBG . . . GR BG.

Alternatively, light emitters are employed with a flux at least 1.3 times higher than the average flux at the underlined positions in the sequence: GRB̲GGRBG . . . GR̲BG.

It should be noted that the above-mentioned embodiments illustrate rather than limit the invention, and that those skilled in the art will be able to design many alternative embodiments without departing from the scope of the appended claims. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

What is being claimed is:

1. An illumination system comprising:
   a set of a pre-determined number of light emitters arranged along a line with N positions, each light emitter outputting a single color, the arrangement of colors along the line not being formed of symmetrical patterns,
   the set having at least three subsets of light emitters, each subset including only light emitters that emit substantially the same color, each respective subset having light emitters that output a color different from the light emitters in other subsets, each subset having at least three light emitters,
   the light emitters of the subset with the fewest number of light emitters, relative to the number of light emitters in each of the remaining subsets in the set, being assigned to respective substantially equidistant positions along the the line of N positions, the subset with the fewest number of light emitters being a first subset,
   the light emitters of the subset with the second fewest number of light emitters, relative to the number of light emitters in each of the remaining subsets in the set, being assigned to respective substantially equidistant positions along the the line of N positions which are not yet occupied by the first subset, the subset with the second fewest number of light emitters being a second subset,
   the light emitters of the subset with the third fewest number of light emitters, relative to the number of light emitters in each of any remaining subsets in the set, being assigned to respective substantially equidistant positions along the the line of N positions which are not yet occupied by the first subset or the second subset, the subset with the third fewest number of light emitters being a third subset, except, if the third subset has the greatest number of light emitters in the set, those light emitters in the third subset are assigned to the positions which are not yet occupied.

2. An illumination system as claimed in claim 1, wherein the assignment of the light emitters of the set takes into account mirroring effects at a beginning and at an end of the line.

3. An illumination system as claimed in claim 1, wherein at least one of the subsets of light emitters comprises at least one tight emitter wit a luminous light output substantially lower than an average light output of light emitters in said subset, said one light emitter being assigned to an area of the line where a distance between light emitters of said subset is smaller than an average distance between light emitters of said subset.

4. An illumination system as claimed in claim 1, wherein at least one of the subsets of light emitters comprises:
   at least a first light emitter with a luminous light output substantially higher than the average light output of light emitters in said subset; and
   at least a second light emitter with a luminous light output substantially lower than the average light output of light emitters in said subset;
   said first and second light emitter being positioned close to each other relative to positions of other light emitters in the at least one subset.

5. An illumination system as claimed in claim 1, wherein at least one of the subsets of light emitters comprises at least one light emitter with color tri-stimulus values differing from an average color tri-stimulus values of the light emitters in said subset, said light emitter being assigned to an area of the line where a distance between light emitters of said subset is smaller than an average distance between light emitters of said subset.

6. An illumination system as claimed in claim 1 comprising at least three subsets of light emitters, the difference in color tri-stimulus values between a first and a second subset being larger than between the other subsets, the light emitters of said first and second subsets being arranged close to each other relative to placement of light emitters from the third subset.

7. An illumination system as claimed in claim 1, wherein the light emitters are arranged at equidistant positions.

8. An illumination system as claimed in claim 1, wherein the illumination system comprises a plurality of sets of the pro-determined number of light emitters, the light emitters of each set being arranged along the line.

9. An illumination system as claimed in claim 8, wherein the light emitters are ranged in an identical manner in each set.

10. A display device comprising a backlight illumination system, the backlight illumination system comprising:
a set of a pre-determined number of light emitters ranged along a line with N positions, each light emitter outputting a single color, the arrangement of colors along the line not being formed of symmetrical patterns,
the set having at least three subsets of light emitters, each subset including only light emitters that emit substantially the same color, each respective subset having light emitters that output a color different from the light emitters in other subsets, each subset having at least three light emitters,
the light emitters of the subset with the fewest number of light emitters, relative to the number of light emitters in each of the remaining subsets in the set, being assigned to respective substantially equidistant positions along the the line of N positions, the subset with the fewest number of light emitters being a first subset,
the light emitters of the subset with the second fewest number of light emitters, relative to the number of light emitters in each of the remaining subsets in the set, being assigned to respective substantially equidistant positions along the the line of N positions which are not yet occupied by the first subset, the subset with the second fewest number of light emitters being a second subset,
the light emitters of the subset with the third fewest number of light emitters, relative to the number of light emitters in each of any remaining subsets in the set, being assigned to respective substantially equidistant positions along the the line of N positions which are not yet occupied by the first subset or the second subset, the subset with the third fewest number of light emitters being a third subset, except, if the third subset has the greatest number of light emitters in the set, those light emitters in the third subset are assigned to the positions which are not yet occupied.

11. A display device as claimed in claim 10, further comprising a liquid crystal display.

12. A method of arranging light emitters in an illumination system, the method comprising:
providing a set of a pre-determined number of light emitters arranged along a line with N positions, each light emitter outputting a single color, the arrangement of colors along the line not being formed of symmetrical patterns, the set having at least three subsets of light emitters, each subset including only light emitters that emit substantially the same color, each respective subset having light emitters that output a color different from the light emitters in other subsets, each subset having at least three light emitters;
assigning the light emitters of the subset with the fewest number of light emitters, relative to the number of light emitters in each of the remaining subsets in the set, to respective substantially equidistant positions along the the line of N positions, the subset with the fewest number of light emitters being a first subset,
assigning the light emitters of the subset with the second fewest number of light emitters, relative to the number of light emitters in each of the remaining subsets in the set, to respective substantially equidistant positions along the the line of N positions which are not yet occupied by the first subset, the subset with the second fewest number of light emitters being a second subset,
assigning the light emitters of the subset with the third fewest number of light emitters, relative to the number of light emitters in each of any remaining subsets in the set, to respective substantially equidistant positions along the the line of N positions which are not yet occupied by the first subset or the second subset, the subset with the third fewest number of light emitters being a third subset, except, if the third subset has the greatest number of light emitters in the set, those light emitters in the third subset are assigned to the positions which are not yet occupied.

13. A method as claimed in claim 12, wherein at least one of the subsets of light emitters comprises at least one light emitter with a luminous light output substantially lower than an average light output of light emitters in said subset, the method further comprising:
assigning said one light emitter to a position where a distance between light emitters of said subset is smaller than an average distance between light emitters of said subset.

14. A method as claimed in claim 12, wherein at least one of the subsets of light emitters comprises at least a first light emitter with a luminous lightoutput substantially higher than the average light output of light emitters in said subset, and at least a second light emitter with a luminous light output substantially lower than the average light output of light emitters in said subset, the method further comprising:
assigning said first and second light emitters to positions close to each other relative to positions of other light emitters in the at least one subset.

15. A method as claimed in claim 12, wherein at least one of the subsets of light emitters comprises at least one light emitter with color tri-stimulus values differing from an average color tri-stimulus values of the light emitters in said subset, the method further comprising:
assigning said light emitter to a position where a distance between light emitters of said subset is smaller than an average distance between light emitters of said subset.

16. A method as claimed in claim 12, wherein the illumination system comprises at least three subsets of light emitters, the difference in color tri-stimulus values between a first avid a second subset being larger than between the other subsets, the method further comprising:
assigning the light emitters of said first and second subsets positions close to each other relative to positions of light emitters from the third subset.

* * * * *

UNITED STATES PATENT AND TRADEMARK OFFICE
CERTIFICATE OF CORRECTION

PATENT NO.         : 7,201,493 B2
APPLICATION NO. : 10/810169
DATED              : April 10, 2007
INVENTOR(S)      : Youri Martynov et al.

It is certified that error appears in the above-identified patent and that said Letters Patent is hereby corrected as shown below:

Column 12, line 51, claim 3:  Cancel "tight" and substitute --light--.

Column 12, line 51, claim 3:  Cancel "wit" and substitute --with--.

Column 13, line 20, claim 8:  Cancel "pro-determined' and substitute --pre-determined--.

Column 13, line 23, claim 9:  Cancel "ranged" and substitute --arranged--.

Column 13, line 27, claim 10:  Cancel "ranged" and substitute --arranged--.

Column 14, line 43, claim 14:  Cancel "lightoutput" and substitute --light output--.

Column 14, line 61, claim 16:  Cancel "avid" and substitute --and--.

Signed and Sealed this

Sixth Day of November, 2007

JON W. DUDAS
*Director of the United States Patent and Trademark Office*